United States Patent [19]

Britten

[11] Patent Number: 5,105,610
[45] Date of Patent: Apr. 21, 1992

[54] CROP STALK GUIDE CUTTERBAR ATTACHMENT

[76] Inventor: Ethan F. Britten, Star Rte. Box 20, Haswell, Colo. 81045

[21] Appl. No.: 691,359

[22] Filed: Apr. 25, 1991

[51] Int. Cl.⁵ .................... A01D 34/18; A01D 34/40
[52] U.S. Cl. ........................... 56/298; 56/17.3; 56/303; 56/313
[58] Field of Search ............... 56/17.3, 298, 303, 309, 56/312, 313, DIG. 17, DIG. 24, 257

[56] References Cited

U.S. PATENT DOCUMENTS

| Re. 2,594 | 5/1867 | Wheeler, Jr. | 56/309 |
|---|---|---|---|
| 353,233 | 11/1886 | Royce | 56/309 |
| 1,239,570 | 9/1917 | Crawford | 56/309 |
| 1,258,740 | 3/1918 | Blocki | 56/313 |
| 1,815,491 | 7/1931 | Braash et al. | 56/312 |
| 1,945,301 | 1/1934 | Wilson | 56/309 |
| 2,053,741 | 9/1936 | Rousch | 56/312 |
| 2,187,438 | 1/1940 | Wilcox | 56/313 |
| 2,577,939 | 12/1951 | Wannebo | 56/309 |
| 2,795,922 | 6/1957 | Hume | 56/257 |
| 3,579,967 | 5/1971 | Schumacher | 56/313 |
| 3,881,305 | 5/1975 | Burrough | 56/257 |
| 4,267,689 | 5/1981 | Schneider et al. | 56/53 |
| 4,630,430 | 12/1986 | Weeks | 56/14.1 |
| 4,750,321 | 6/1988 | Klein | 56/310 |
| 4,909,026 | 3/1990 | Molzahn et al. | 56/298 |

Primary Examiner—George A. Suchfield
Attorney, Agent, or Firm—John R. Flanagan

[57] ABSTRACT

A crop stalk guide assembly for use on a crop gathering header cutterbar of a crop harvesting machine includes a support framework and a plurality of flat guide plates. The support framework is attachable to the cutterbar of the crop gathering header so as to extend forwardly from below the sickle guards and a sickle of the cutterbar. The flat guide plates are attached on the top of a forward portion of the support framework so as to extend above the cutterbar sickle guards and sickle. The guide plates are spaced laterally from one another so as to define elongated passageways between them running in the direction of forward travel and leading rearwardly between the sickle guards to the sickle of the cutterbar.

14 Claims, 2 Drawing Sheets

CROP STALK GUIDE CUTTERBAR ATTACHMENT

BACKGROUND OF THE INVENTION

1. Field of the Invention

The present invention generally relates to crop harvesting equipment and, more particularly, is concerned with a crop stalk guide assembly for attachment to a cutterbar of a crop harvesting machine header.

2. Description of the Prior Art

Crop harvesting machines, such as combines, are commonly used to gather and harvest grain-bearing stalk crops as the machine is moved across the field. In the case of short stalk row crops, such as soybeans and milo, the crop harvesting machine gathers the crop by cutting the stalks close to the ground and feeding the severed grain-bearing stalks into the machine. The machine harvests the grain from the stalks by first threshing the severed stalks and finally separating the grain from the threshed stalks.

Crop harvesting machines typically utilize crop headers mounted transversely across their forward ends to cut and gather a wide swath of the crop upon each pass through the field. The crop gathering headers commonly employ cutterbars extending transversely to the path of movement of the machine through the field and positioned close to the ground for severing the crop stalks close to the ground.

Crop gathering headers also usually employ devices for guiding the crop stalks into the cutterbars. The particular guide device employed depends on what crop is being harvested. For short stalk row crops, such as milo, one type of stalk guide device which has used heretofore is constructed of a number of rod-like fingers which attach to the cutterbar and extend forwardly on opposite sides of the stalk rows. At their forward ends, the fingers, in turn, mount springy tines which extend rearwardly on opposite sides of the stalk rows.

Problems have been encountered with this type of stalk guide device that impede the overall efficiency of harvesting operations. First, under certain tangled crop conditions, the tines can break off and be pulled into the cutterbar causing damage which requires temporary shutdown of the harvesting machine until repairs are made. Second, weeds intermingled with the crop stalks tend to catch on and plug the guide fingers, eventually impeding the smooth flow of the crop stalks to the cutterbar and requiring temporary suspension of the harvesting operation until the plugged weeds are cleaned out.

Consequently, a need exists for improvement of the design of devices used for assisting in guiding crop stalks into the cutterbar of a crop harvesting machine gathering header.

SUMMARY OF THE INVENTION

The present invention provides a crop stalk guide assembly designed to satisfy the aforementioned need. The crop stalk guide assembly of the present invention is preferably provided as an attachment to a cutterbar of a crop harvesting machine header. The guide assembly assists in guiding crop stalks into the cutterbar without experiencing plugging and breakage problems associated with the prior art guide device.

Accordingly, the present invention is directed to a crop stalk guide assembly for use on a crop gathering header of a crop harvesting machine. The crop gathering header may be of the type having a cutterbar mounted transversely along a forward edge of the header. The cutterbar can include a row of laterally-spaced forwardly-extending sickle guards and a sickle composed of a row of blade sections which reciprocally moves laterally through the sickle guards and cooperates with the guards to sever the crop stalks.

The crop stalk guide assembly of the present invention comprises: (a) a support framework attachable to the cutterbar of the crop gathering header so as to extend forwardly and below the sickle guards and sickle of the cutterbar; and (b) a plurality of arcuate flat guide plates attached on the top of a forward portion of the support framework so as to extend above the sickle guards and sickle of the cutterbar. The guide plates also are spaced laterally from one another so as to define passageways between them running in the direction of forward travel and leading rearwardly between the sickle guards to the sickle of the cutterbar.

The support framework of the guide assembly has a rear portion and a front portion. The rear portion includes a transverse mounting member attachable to the underside of the sicklebar. The front portion includes a plurality of flat support members rigidly attached at their rear ends to the transverse mounting member and extending forwardly therefrom in laterally spaced relation to one another. The support framework further includes a plurality of hollow rings attached on the top of the flat support members and spaced forwardly from the transverse mounting member. The hollow rings are positioned in alignment with the sickle guards of the cutterbar for receiving the pointed forward tips of the guards.

The flat guide plates of the guide assembly have front portions, rear portions and middle portions extending between and rigidly interconnecting the front and rear portions which serve different functions. The spaces between the respective lateral edges of the middle portions of the adjacent guide plates define the narrow passageways which lead to the cutterbar. The lateral edges of the front portions of the guide plates are tapered forwardly and toward one another and terminate at points so as to provide crop dividers for separating the stalks in adjacent rows from one another.

The lateral edges of the rear portions of the guide plates are, farther from to one another than are the lateral edges of the middle portions of the guide plates so as to define rear notches which are vertically aligned with cutting edges of the adjacent sickle guards located on opposite sides of the passageways. The rear notches in the guide plates provide sufficient clearance at the rear portions of the guide plates for the crop stalks to enter between the respective sickle blade sections and sickle guards for accomplishment of the severing of the stalks by the cutting action of the moving blade sections against the stationary cutting edges of the sickle guards.

Also, the guide plates have slick upper surfaces. The slick surfaces promote the smooth flow of crop stalks through the passageways between the plates and the sweeping of loose grain which has fallen on the guide plates rearwardly along the upper surfaces of the guide plates and over the cutterbar with the severed crop stalks.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

In General

Figure 1:
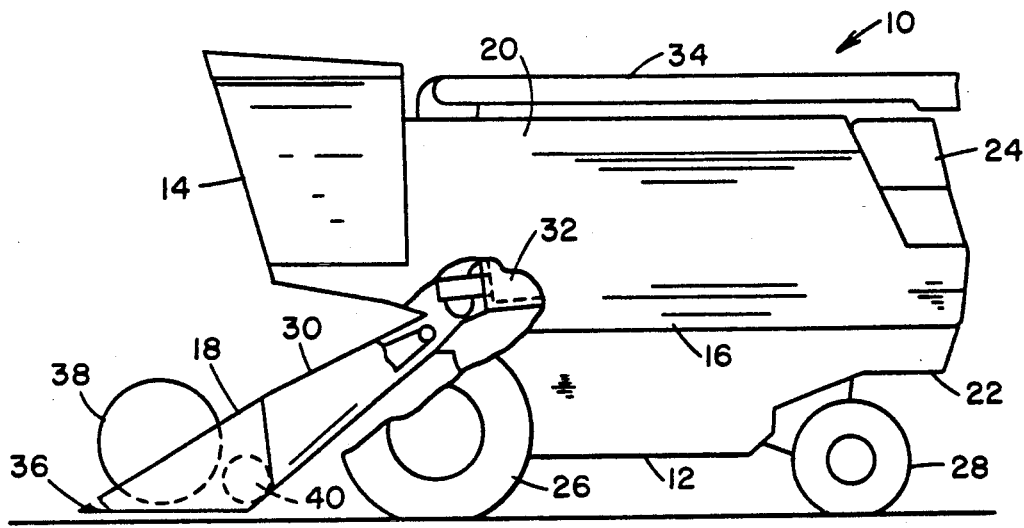
FIG. 1 is a schematic side elevational view of an exemplary crop harvesting machine, such as a combine, to which the crop stalk guide assembly of the present invention can be applied.
Figure 2:
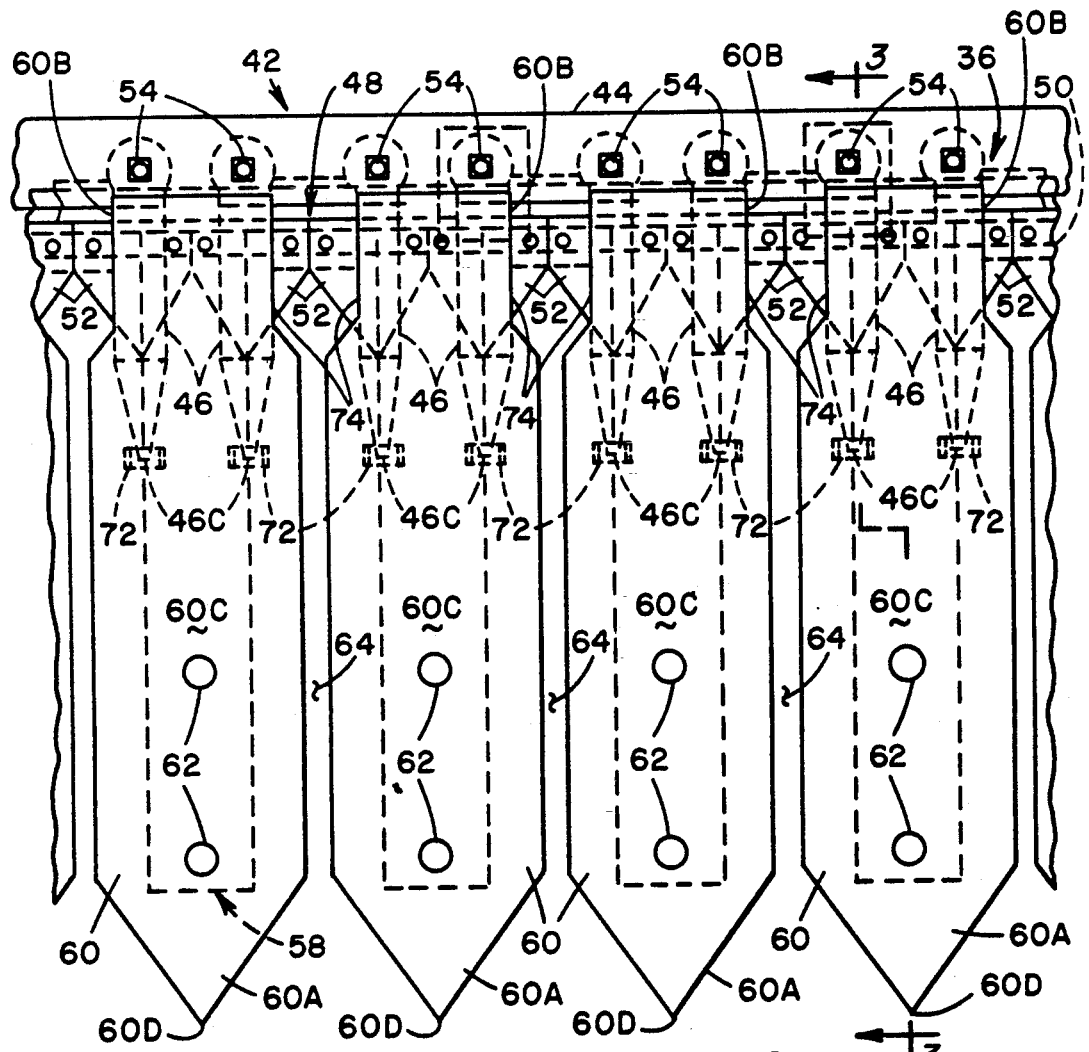
FIG. 2 is an enlarged fragmentary top plan view of the cutterbar of the combine of FIG. 1 with the crop stalk guide assembly of the present invention applied thereto.
Figure 3:
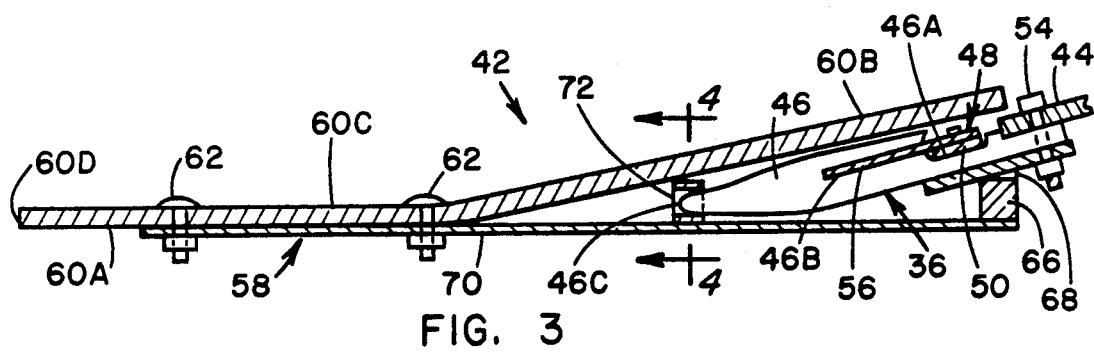
FIG. 3 is an enlarged longitudinal sectional view of the guide assembly taken along line 3—3 of FIG. 2.
Figure 4:
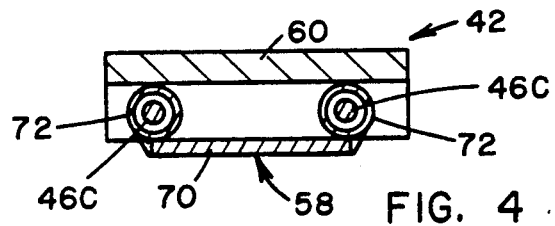
FIG. 4 is a transverse sectional view of the guide assembly taken along line 4—4 of FIG. 3.
Figure 5:
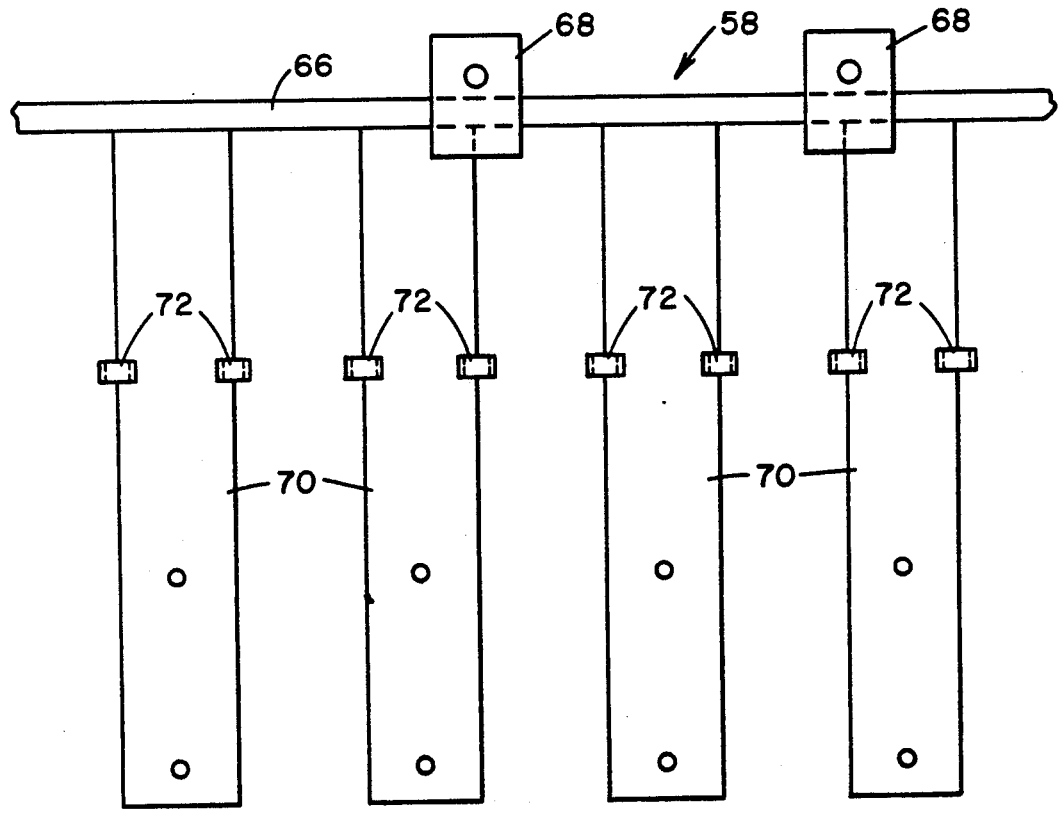
FIG. 5 is a top plan view of a support framework of the guide assembly.

Referring to the drawings, and particularly to FIG. 1, there is illustrated a crop harvesting machine, generally designated 10, which is a conventionally well-known combine. The combine 10 includes a mobile chassis 12 and has an operator's cab 14, a main housing 16, a crop cutting and gathering header 18, a grain storage bin 20, a rear discharge compartment 22, and an engine compartment 24, all supported by the chassis 12.

All of the moving elements of the combine 10 are driven by an internal combustion engine located within the engine compartment 24. The engine being of substantial horsepower, is adapted not only to drive all of the moving components of the combine 10 but also is capable of operating the drive wheels 26 of the combine which, together with the rear wheels 28, render the combine self-propelled.

The combine 10 harvests grain from standing crop stalks by first severing the stalks from the field and then gathering and feeding the grain-bearing severed stalks from the header 18 through a crop elevator 30 to a crop threshing and separating mechanism 32 operatively mounted in the main housing 16. The mechanism 32 harvests the grain from the severed stalks by first threshing the stalks and finally separating the grain from the threshed stalks before discharge of the stalks and other waste material through the rear discharge compartment 22. The separated grain, in turn, is conveyed within the machine to the grain storage bin 20 for later transfer from the combine 12 by an unloading auger 34 connected to the storage bin 20.

The header 18 is mounted transversely across the forward end of the crop elevator 30 and is operable to cut and gather the crop as the combine 10 is driven across the field. The crop header 18 typically employs a cutterbar 36, a rotatable reel 38, and a converging auger 40. All of these components extend transversely to the path of movement of the combine 10 through the field and are operable for severing the crop stalks relatively close to the ground and gathering and consolidating the severed crop stalks for discharge rearwardly to the crop elevator 30.

Crop Stalk Guide Assembly of the Invention

Referring to FIGS. 2-5, there is illustrated a crop stalk guide assembly, generally designated 42, for use in conjunction with the cutterbar 36 on the crop cutting and gathering header 18 of the prior art combine 10. The cutterbar 36, as conventionally known per se, is mounted transversely along a forward edge of the crop cutting and gathering header 18. The cutterbar 36 includes a transverse support bar 44 attached along the forward edge of the header 18, a row of laterally-spaced forwardly-extending sickle guards 46, and a sickle 48 composed of a driven strip 50 and a row of blade sections 52 fastened in side-by-side relation along the driven strip 50.

The sickle guards 46 are attached by suitable fasteners 54 to the underside of the transverse support bar 44. The driven strip 50 of the sickle 48 is mounted along an aligned row of depressions 46A in the sickle guards 46 for reciprocal movement relative thereto by a conventional drive mechanism (not shown) connected to an end of the driven strip 50. As the driven strip 50 of the sickle 48 moves laterally relative to the sickle guards 46, the blade sections 52 of the sickle reciprocally move through slots 56 in the sickle guards 46. The moving blade sections 52 of the sickle 48 cooperate with the stationary cutting edges 46B on the guards 46 to sever the crop stalks.

Referring still to FIGS. 2-5, the crop stalk guide assembly 42 of the present invention basically includes a support framework 58 attached to the transverse support bar 44 of the cutterbar 36 below the sickle guards 46, and a plurality of flat guide plates 60 attached on the support framework 58. The support framework 58 extends forwardly from below the sickle guards 46 and the sickle 48 of the cutterbar 36. The flat guide plates 60 are each attached by a pair of fasteners 62 on the top of a forward portion of the support framework 58 so as to extend above the sickle guards 46 and sickle 48 of the cutterbar 36 and forwardly thereof. The guide plates 60 also are spaced laterally from one another so as to define elongated narrow passageways 64 between the guide plates 60 running in the direction of forward travel and leading rearwardly between the sickle guards 46 to the sickle 48 of the cutterbar 36. Preferably, the passageways 64 between the adjacent guide plates 60 are much narrower in width than the widths of the guide plates themselves.

More particularly, the support framework 58 of the guide assembly 42 includes a transversely-extending rigid mounting member in the form of an elongated mounting bar 6 with spaced mounting tabs 68 by which the mounting bar 6 is attached to the underside of the transverse support guards 46 to the support bar 44. The support framework 58 also includes a plurality of flat support members 70 rigidly attached at their rear ends, such as by welding, to the transverse mounting bar 66 and extending forwardly therefrom in laterally spaced relation to one another.

The support framework 58 further includes a plurality of hollow rings 72, arranged in spaced pairs and rigidly attached on the top of each of the flat support members 70. The pairs of rings 72 are located about midway between front and rear ends of the flat support member and spaced forwardly from the transverse mounting bar 66. The hollow rings 72 are positioned in alignment with the sickle guards 46 of the cutterbar 36 for receiving the pointed forward tips 46C of the guards 46 through the hollow interiors of the rings 72.

Further, each guide plate 60 has front and rear portions 60A, 60B, and a middle portion 60C extending between and rigidly connecting the front and rear portions 60A, 60B. The front, rear, and middle portions 60A, 60B, 60C serve different functions.

More particularly, the space between respective lateral edges of the middle portions 60C of adjacent guide plates 60 define the narrow passageways 64 which lead to the cutterbar sickle 48. The lateral edges of the front portion 60A of each guide plate 60 is tapered forwardly and toward one another and terminates at a point 60D so as to provide a crop divider for separating the stalks of adjacent rows from one another.

The lateral edges of the rear portions 60B of the guide plate 60 are farther from to one another than are the lateral edges of the middle portions 60C thereof so as to define opposite rear notches 74 which are vertically aligned with the cutting edges 46B of the adjacent sickle guards 46 located on opposite sides of the passageways 64. The rear notches 74 in the guide plates 60 provide sufficient clearance at the rear portions 60B of the guide plates 60 for the crop stalks to enter between the respective sickle blade sections 52 and sickle guards 46 for accomplishment of the severing of the stalks by the cutting action of the moving blade sections 52 against the stationary cutting edges 46B of the sickle guards 46.

Each flat guide plate 60 of the guide assembly 42 has a generally arcuate shape along the longitudinal dimension or length of the plate 60. The attachment of each guide plate 60 by the fasteners 62 to the flat support members 70 at the forward half of the plate and the positioning of the rearward half of the plate 60 over the rings 72 on the flat support members 70 produces a bend in the guide plate 60 approximately halfway between its opposite ends and thus the generally arcuate shape of the plate 60. Thus, the rearward half of the plate 60 is more inclined relative to the horizontal than the forward half thereof.

Also, the guide plates 60 have slick upper surfaces. The slick surfaces promote the smooth flow of crop stalks through the passageways 64 between the plates 60. The slick surfaces also promote the sweeping of loose grain which has fallen on the guide plates 60 rearwardly along the upper surfaces of the guide plates 60 and over the cutterbar 36 with the severed crop stalks so as to reduce grain losses. The desired quality of slickness of the guide plate top surface can be supplied by use of a suitable plastic material or, alternatively, by polishing the surface of a guide plate composed of metal.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

Having thus described the invention, what is claimed is:

1. A crop stalk guide assembly for use on a crop gathering header having a cutterbar including a row of laterally-spaced forwardly-extending sickle guards and a sickle having a row of blade sections reciprocally movable laterally through the sickle guards and cooperable therewith to sever crop stalks, said crop stalk guide assembly comprising:

(a) a support framework having a rear portion and a front portion and being attachable at said rear portion to a header cutterbar so as to extend at said front portion forwardly from below the sickle guards and sickle of the cutterbar; and (b) a plurality of flat guide plates attached on said forward portion of said support framework so as to extend above the sickle guards and sickle of the cutterbar, said guide plates also being spaced laterally from one another so as to define elongated passageways between said guide plates running in the direction of forward travel and leading rearwardly between the sickle guards to the sickle of the cutterbar;

(c) each of said guide plates having a front portion, a rear portion and a middle portion extending between and rigidly connecting said front and rear portions, said middle portions of adjacent ones of said laterally-spaced guide plates having lateral edges with spaces therebetween that define said passageways which lead to the cutterbar, said passageways between said adjacent guide plates being narrower in width than the width of said guide plates.

2. The guide assembly of claim 1 wherein said flat guide plates along the length thereof have a generally arcuate shape.

3. The guide assembly of claim 1 wherein said support framework includes:

a transversely-extending rigid mounting member attachable to the underside of the cutterbar; and a plurality of flat support members rigidly attached at their rear ends to said transverse mounting member and extending forwardly therefrom in laterally spaced relation to one another.

4. The guide assembly of claim 3 wherein said support framework further includes a plurality of hollow rings attached on a top of said flat support members and spaced forwardly from said transverse mounting member, said hollow rings being positioned in alignment with the sickle guards of the cutterbar to receive forward tips of the guards when the transverse mounting member of said framework is attached to the cutterbar.

5. The guide assembly of claim 1 wherein said front portions of said guide plates have lateral edges that taper forwardly and toward one another and terminate at points so as to provide crop dividers for separating the stalks in adjacent rows from one another.

6. The guide assembly of claim 1 wherein said rear portions of said guide plates have lateral edges being farther from one another than are said lateral edges of said middle portions of said guide plates so as to define opposite rear notches in said rear portions of said guide plates that are vertically aligned with cutting edges of the adjacent sickle guards located on opposite sides of said passageways, said rear notches in said guide plates providing sufficient clearance at said rear portions of said guide plates for the crop stalks to enter between the respective sickle blade sections and sickle guards for accomplishment of the severing of the stalks by the cutting action of the moving blade sections against the stationary cutting edges of the sickle guards.

7. The guide assembly of claim 1 wherein said guide plates have slick upper surfaces capable of providing smooth flow of crop stalks through said passageways between said plates and sweeping of loose grains rearwardly along said upper surfaces of said guide plates and over the cutterbar with the severed portions of the crop stalks.

8. In combination with a cutterbar on a crop gathering header of a crop harvesting machine, said cutterbar being mounted transversely along a forward edge of said header and including a row of laterally-spaced forwardly-extending sickle guards and a sickle having a row of blade sections which are reciprocally movable laterally through slots in said sickle guards and cooperate with said sickle guards to sever crop stalks, a crop stalk guide assembly comprising:

(a) a support framework having a rear portion and a front portion and being attachable at said rear portion to said header cutterbar so as to extend at said front portion forwardly from below said sickle guards and sickle of said cutterbar; and (b) a plurality of flat guide plates attached on said forward portion of said support framework so as to extend above the sickle guards and sickle of said cutterbar, said guide plates also being spaced laterally from one another so as to define elongated passageways between said guide plates running in the direction of forward travel and leading rearwardly between said sickle guards to said sickle of the cutterbar;

(c) each of said guide plates having a front portion, a rear portion and a middle portion extending between and rigidly connecting said front and rear portions, said middle portions of adjacent ones of said laterally-spaced guide plates having lateral edges with spaces therebetween that define said passageways which lead to the cutterbar, said passageways between said adjacent guide plates being narrower in width than the width of said guide plates.

9. The guide assembly of claim 8 wherein said flat guide plates along the length thereof have a generally arcuate shape.

10. The guide assembly of claim 8 wherein said support framework includes:

a transversely-extending rigid mounting member attachable to the underside of said cutterbar; and a plurality of flat support members rigidly attached at their rear ends to said transverse mounting member and extending forwardly therefrom in laterally spaced relation to one another.

11. The guide assembly of claim 10 wherein said support framework further includes a plurality of hollow rings attached on a top of said flat support members and spaced forwardly from said transverse mounting member, said hollow rings being positioned in alignment with said sickle guards of said cutterbar and receiving forward tips of said guards.

12. The guide assembly of claim 8 wherein said front portions of said guide plates have lateral edges that taper forwardly and toward one another and terminate at points so as to provide crop dividers for separating the stalks in adjacent rows from one another.

13. The guide assembly of claim 8 wherein said rear portions of said guide plates have lateral edges being farther from one another than are said lateral edges of said middle portions of said guide plates so as to define opposite rear notches in said rear portions of said guide plates that are vertically aligned with cutting edges of adjacent ones of said sickle guards located on opposite sides of said passageways, said rear notches in said guide plates providing sufficient clearance at said rear portions of said guide plates for the crop stalks to enter between said respective sickle blade sections and sickle guards for accomplishment of the severing of the stalks by the cutting action of the moving blade sections against the stationary cutting edges of the sickle guards.

14. The guide assembly of claim 8 wherein said guide plates have slick upper surfaces capable of providing smooth flow of crop stalks through said passageways between said plates and of sweeping loose grain rearwardly along said upper surfaces of said guide plates and over said cutterbar with the severed crop stalks.

* * * * *